(12) United States Patent
Wang et al.

(10) Patent No.: US 12,130,981 B2
(45) Date of Patent: Oct. 29, 2024

(54) DISPLAY DEVICE AND DISPLAY APPARATUS INCLUDING THE SAME

(71) Applicants: Chengdu BOE Optoelectronics Technology Co., Ltd., Sichuan (CN); BOE Technology Group Co., Ltd., Beijing (CN)

(72) Inventors: Zijian Wang, Beijing (CN); Xu Lu, Beijing (CN); Qing Gong, Beijing (CN); Hongjie Jiang, Beijing (CN)

(73) Assignees: CHENGDU BOE OPTOELECTRONICS TECHNOLOGY CO., LTD., Sichuan (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 18/288,446

(22) PCT Filed: Nov. 15, 2021

(86) PCT No.: PCT/CN2021/130647
§ 371 (c)(1),
(2) Date: Oct. 26, 2023

(87) PCT Pub. No.: WO2022/227501
PCT Pub. Date: Nov. 3, 2022

(65) Prior Publication Data
US 2024/0211067 A1  Jun. 27, 2024

(30) Foreign Application Priority Data
Apr. 30, 2021  (CN) .......................... 202120939066.2

(51) Int. Cl.
*G06F 3/041* (2006.01)
*G06F 3/044* (2006.01)
*G09G 3/20* (2006.01)

(52) U.S. Cl.
CPC ........ *G06F 3/04164* (2019.05); *G06F 3/0446* (2019.05); *G09G 3/2096* (2013.01); *G09G 2330/06* (2013.01)

(58) Field of Classification Search
CPC . G06F 3/04164; G06F 3/0446; G09G 3/2096; G09G 2330/06
See application file for complete search history.

(56) References Cited

U.S. PATENT DOCUMENTS 10,325,925 B2  6/2019  Dong et al.
10,964,726 B2  3/2021  Chen et al.
(Continued)

FOREIGN PATENT DOCUMENTS

CN  106684093 A  5/2017
CN  111403423 A  7/2020
(Continued)

OTHER PUBLICATIONS

International Search Report and Written Opinion mailed on Feb. 11, 2022, in corresponding PCT/CN2021/130647, 6 pages.

*Primary Examiner* — Mihir K Rayan
(74) *Attorney, Agent, or Firm* — XSENSUS LLP (57) ABSTRACT

A display device is provided. The display device has a display area and a non-display area adjacent thereto, an insulating protective layer is provided in the non-display area, and a first gap is provided between the insulating protective layer and the display area. The display device includes: a display substrate including a base substrate and a display structure layer formed thereon; a first conductive line on the display substrate, an orthographic projection of the first gap on the base substrate being coincided with or being within an orthographic projection of the first conductive line on the base substrate, and an extension direction of the first conductive line being the same as an extension direction of the first gap; and a first insulating layer on the (Continued)

first conductive line and provided with a via hole, the via hole being connected to the first conductive line to expose the same.

18 Claims, 6 Drawing Sheets

(56) References Cited

U.S. PATENT DOCUMENTS

| | | |
|---|---|---|
| 2018/0026051 A1 | 1/2018 | Dong et al. |
| 2020/0133052 A1* | 4/2020 | Gu .................. G02F 1/1339 |
| 2020/0328232 A1 | 10/2020 | Chen et al. |
| 2021/0013270 A1* | 1/2021 | Yu ..................... H10K 59/8721 |

FOREIGN PATENT DOCUMENTS

| | | |
|---|---|---|
| CN | 111863903 A | 10/2020 |
| CN | 215494959 U | 1/2022 |
| WO | 2021/190055 A1 | 9/2021 |

* cited by examiner

FIG. 6

DISPLAY DEVICE AND DISPLAY APPARATUS INCLUDING THE SAME

CROSS-REFERENCE TO RELATED APPLICATIONS

The present application is a U.S. National Stage of International Application No. PCT/CN2021/130647, filed on Nov. 15, 2021, which claims priority to Chinese Patent Application No. 202120939066.2, titled "Display Device And Display Apparatus" filed on Apr. 30, 2021, the entire contents of each are incorporated herein by reference.

TECHNICAL FIELD

The present disclosure relates to the field of display technology, and specifically, to a display device and a display apparatus including the same.

BACKGROUND

In the field of electronic products, ESD (electro-static discharge) problems are commonplace. In all the processes, no matter in the process of manufacturing products or in the process of sending the products to consumers, there will be the ESD problems. ESD may cause electrical problems such as device breakdown, abnormal color display, TP (touch panel) disconnection. Terminal customers have high requirements for ESD. Air discharge ESD reliability test standard has reached ±14 KV. This brings a higher challenge to display manufacturers.

It is to be noted that the above information disclosed in the Background section is only for enhancement of understanding of the background of the present disclosure and therefore it may contain information that does not form the prior art that is already known to a person skilled in the art.

SUMMARY

The present disclosure is to provide a display device.

An aspect of the present disclosure provides a display device having a display area and a non-display area adjacent to the display area, an insulating protective layer being provided in the non-display area, and a first gap being provided between the insulating protective layer and the display area, the display device includes:
  a display substrate including a base substrate and a display structure layer formed on the base substrate;
  a first conductive line provided on the display substrate, an orthographic projection of the first conductive line on the base substrate being coincided with an orthographic projection of the first gap on the base substrate, or the orthographic projection of the first gap on the base substrate being within the orthographic projection of the first conductive line on the base substrate, and an extension direction of the first conductive line being the same as an extension direction of the first gap; and
  a first insulating layer provided on a side of the first conductive line away from the base substrate, the first insulating layer being provided with a via hole, and the via hole being connected to the first conductive line to expose the first conductive line.

In an exemplary embodiment of the present disclosure, the display device further includes:
  a second conductive line provided in the non-display area and connected to a ground electrode, the second conductive line being connected to an end of the first conductive line, and an extension direction of the second conductive line being intersected with the extension direction of the first conductive line.

In an exemplary embodiment of the present disclosure, the display device further includes:
  a third conductive line provided in the non-display area and connected to the ground electrode, the third conductive line being connected to another end of the first conductive line, and an extension direction of the third conductive line being intersected with the extension direction of the first conductive line.

In an exemplary embodiment of the present disclosure, the display device further includes:
  an encapsulation layer provided on a side of the display substrate; and
  a touch structure provided on a side of the encapsulation layer away from the display substrate, and in the display area, the touch structure including a plurality of first touch units and a plurality of second touch units.

In an exemplary embodiment of the present disclosure, the display device further includes:
  a polarizer provided on a side of the touch structure away from the display substrate,
  wherein the insulating protective layer is a metal cover adhesive layer, and the first gap is a gap between the metal cover adhesive layer and the polarizer.

In an exemplary embodiment of the present disclosure, a bonding area is provided in the non-display area, and the display device further includes:
  a heat dissipation film provided on a side of the display substrate away from the encapsulation layer;
  a main control circuit board bonded to the bonding area, one or both of the second conductive line and the third conductive line being electrically connected to the main control circuit board; and
  a conductive adhesive layer adhered between the heat dissipation film and the main control circuit board,
  wherein one or both of the second conductive line and the third conductive line is electrically connected to the heat dissipation film via the conductive adhesive layer so as to be grounded.

In an exemplary embodiment of the present disclosure, the touch structure includes:
  a second insulating layer provided on a side of the encapsulation layer away from the base substrate;
  a first touch metal layer provided on a side of the second insulating layer away from the base substrate;
  a third insulating layer provided on a side of the first touch metal layer away from the base substrate; and
  a second touch metal layer provided on a side of the third insulating layer away from the base substrate,
  wherein the first insulating layer is provided on a side of the second touch metal layer away from the base substrate, and
  the first conductive line, the second conductive line and the third conductive line all are provided in a same layer as the second touch metal layer and formed of a same material as the second touch metal layer.

In an exemplary embodiment of the present disclosure, the display device further includes:
  a touch-sensing lead group provided in the non-display area, the touch-sensing lead group including a plurality of touch-sensing leads, and the touch-sensing lead being connected between the first touch unit and the bonding area;

at least two touch-sensing ground leads provided in the non-display area and correspondingly located at two opposite sides of the touch-sensing lead group;

a touch-driving lead group provided in the non-display area, the touch-driving lead group including a plurality of touch-driving leads, and the touch-driving lead being connected between the second touch unit and the bonding area; and at least two touch-driving ground leads provided in the non-display area and correspondingly located at two opposite sides of the touch-driving lead group, wherein a portion of the touch-sensing leads and a portion of the touch-driving leads are provided at two opposite sides of the display area.

In an exemplary embodiment of the present disclosure, one of the two touch-sensing ground leads close to the display area is the second conductive line; and one of the two touch-driving ground leads close to the display area is the third conductive line.

Another aspect of the present disclosure provides a display apparatus including the display device as described above.

It should be understood that the above general description and the detailed descriptions that follow are only exemplary and explanatory and do not limit the present disclosure.

BRIEF DESCRIPTION OF THE DRAWINGS

The accompanying drawings herein are incorporated into and form a part of the specification, illustrate embodiments consistent with the present disclosure, and are used in conjunction with the specification to explain the principles of the present disclosure. Obviously, the accompanying drawings in the following description are only some of the embodiments of the present disclosure, and a person skilled in the art may obtain other accompanying drawings from these drawings without creative work.

DETAILED DESCRIPTION

Example embodiments will now be described more fully with reference to the accompanying drawings. However, the example embodiments may be implemented in various forms and should not be construed as being limited to the implementations set forth herein; rather, these embodiments are provided so that the present disclosure is comprehensive and complete and the idea of the example embodiments can be conveyed comprehensively to a person skilled in the art. The same reference numerals in the drawings denote the same or similar structures, and thus detailed descriptions thereof will be omitted. In addition, the accompanying drawings are only schematic illustrations of the present disclosure and are not necessarily drawn to scale.

Although relativity terms such as "on" and "below" are used in this specification to describe the relative relationship of one component to another component as shown in the figures, these terms are used in the specification only for convenience of description, e.g., based on the example direction described in the accompanying drawings. It will be appreciated that if the device shown is flipped to be upside down, the component described as being "on" will become the component described as being "below". When a structure is "on" another structure, it may mean that the structure is integrally formed on the other structure, or that the structure is "directly" provided on the other structure, or that the structure is "indirectly" provided on the other structure via an additional structure.

The terms "a", "an", "the". "said" and "at least one" are used to indicate the presence of one or more elements/components/etc.; the terms "including" and "having" are used to indicate open-ended inclusion and mean that there may be additional elements/components/etc. in addition to those listed; and the terms "first", "second". "third", etc. are used only as markers and are not intended to limit be the quantity of objects thereof.

In the specification, the term "parallel" refers to a state in which the angle formed by two straight lines is −10° or more and 10° or less, and therefore also includes a state in which the angle is −5° or more and 5° or less.

One method for solving the ESD problem is to conduct away static electricity, that is, to make the grounding area to be relatively large to achieve a full grounding, but this method is more general, which does not solve the ESD problem from the root cause such as the electrostatic breakdown location.

Figure 5:
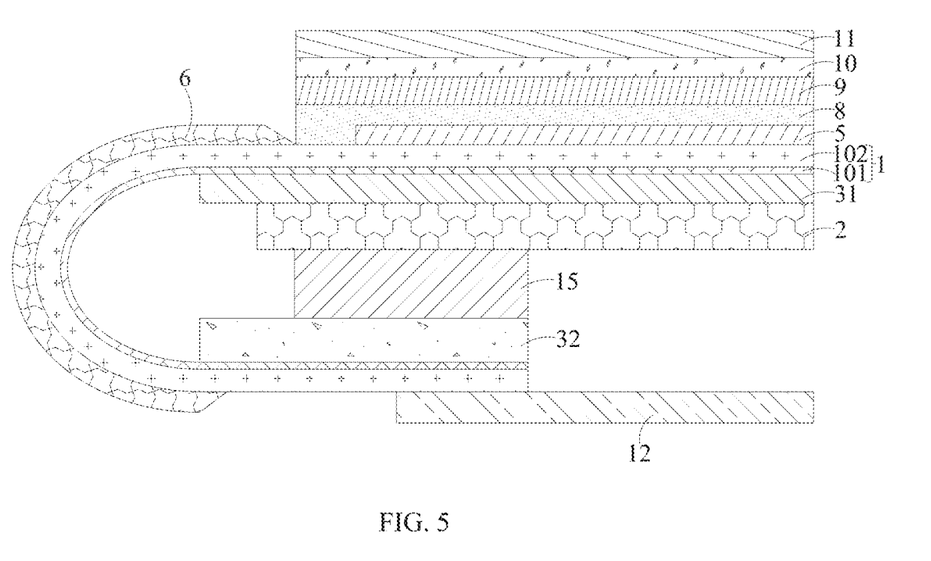
FIG. 5 is a schematic structure diagram of a display device in which a metal cover adhesive layer is coated to flush with the edge of a polarizer.

An insulating protective layer 6 may be a metal cover adhesive layer. In the present disclosure, it finds that ESD may puncture a display device at a first gap 13 between a polarizer 9 and MCL (metal cover layer) adhesive layer (there will leave a gap of 0.2 mm between the edge of the metal cover adhesive layer and the edge of the polarizer 9), resulting an abnormal display in the process of ESD test. As show in FIG. 5, the insulating protective layer 6 may be coated to be flush with the edge of the polarizer 9, and the insulating protective layer 6 may block the transmission of ESD. However, as the insulating protective layer 6 has an adhesive overflow area with a large tolerance, it cannot ensure that the gap between each insulating protective layer 6 of the display device and the polarizer 9 is covered by 100%, which renders batch-based abnormal display due to the process instability. Further, the surface of the display device is also covered by an insulating layer (which is about 5 micrometers and thinner than the insulating protective layer 6), and thus even if the insulating protective layer 6 covers the display device, the ESD cannot be blocked at a location where the insulating protective layer 6 is thinly coated.

An embodiment of the present disclosure provides a display device. As shown in FIGS. 1 to 4 and FIG. 6, the display device has a display area AA and a non-display area FA adjacent to the display area AA, a bonding area BOD is provided in the non-display area FA, an insulating protective layer 6 is provided in the non-display area FA, and a first gap 13 is provided between the insulating protective layer 6 and the display area AA. The display device includes a display substrate 1, a first conductive line 7, and a first insulating layer 83. The display substrate 1 includes a base substrate 101 and a display structure layer 102 formed on the base substrate 101. The first conductive line 7 is provided on the display substrate 1, an orthographic projection of the first conductive line 7 on the base substrate 101 is coincided with an orthographic projection of the first gap 13 on the base substrate 101, or the orthographic projection of the first gap 13 on the base substrate 101 is within the orthographic projection of the first conductive line 7 on the base substrate 101, and an extension direction of the first conductive line 7 is the same as an extension direction of the first gap 13. The first insulating layer 83 is provided on a side of the first conductive line 7 away from the base substrate 101, the first insulating layer 83 is provided with a via hole 831, and the via hole 831 is connected to the first conductive line 7 to expose the first conductive line 7.

In the display device of the present disclosure, in the ESD reliability test, when static electricity enters the display device from the first gap 13 between the polarizer 9 and the insulating protective layer 6, the static electricity will be conducted along the first conductive line 6 with a lower resistivity. Further, the first conductive line 7 is exposed through the via hole 831, and the surface of the first conductive line 7 is not covered by an insulating layer, therefore the static electricity is more likely to be accumulated at the exposed surface of the first conductive line 7 and thus may be conducted away through a ground lead GND, thereby preventing the static electricity from causing electrical problems such as device breakdown, abnormal color display, TP (touch panel) disconnection.

In an example embodiment, the display device has the display area AA and the non-display area FA adjacent to the display area AA, and the display area AA may be rectangular, circular, and the like. The non-display area FA is provided with a lead area, a bending area, and the bonding area BOD. The bending area is located between the display area AA and the bonding area BOD, and the display device may be bent in the bending area to form an arc. The lead area may surround the display area AA, and in the case where the display area AA is rectangular, the lead area may include a first side area C1, a second side area C2, a third side area C3, and a fourth side area C4. The first side area C1 is provided between the display area AA and the bonding area BOD, and the second side area C2, the third side area C3, and the fourth side area C4 are arranged counterclockwise in that order.

Figure 1:
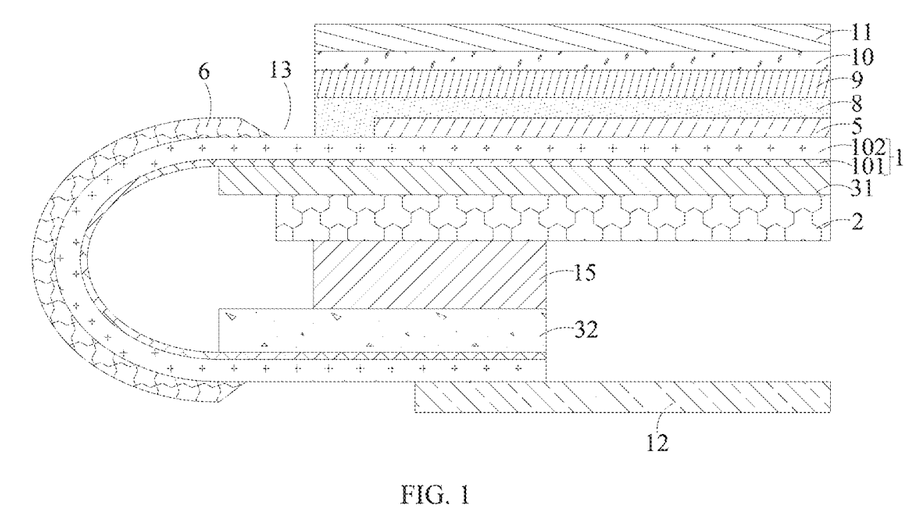
FIG. 1 is a schematic cross-sectional structure diagram of a display device according to an exemplary embodiment of the present disclosure.

FIG. 1 is a schematic structure diagram of a display device with a surface-covered touch structure. Referring to FIG. 1, the display device may include the display substrate 1, an encapsulation layer 5 provided on a side of the display substrate 1, a touch structure 8 provided away from a side of the display substrate 1, a polarizer 9 provided on a side of the touch structure 8 away from the display substrate 1, an optical adhesive layer 10 provided on a side of the polarizer 9 away from the display substrate 1, and a cover plate 11 provided on a side of the optical adhesive layer 10 away from the display substrate 1. A first back film 31 is provided on a side of the display substrate 1 away from the encapsulation layer 5, and a heat dissipation film 2 is provided on a side of the first back film 31 away from the display substrate 1.

An end of the display substrate 1 is bonded and connected to the main control circuit board 12, and the end of the display substrate 1 connected to the main control circuit board 12 is bent to the non-display side of the display substrate 1 to reduce a bezel width of the display device. A second back film 32 is provided on a side, facing the heat dissipation film 2, of the end of the display substrate 1 connected to the main control circuit board 12, and a support plate 15 is provided between the second back film 32 and the heat dissipation film 2 for supporting and forming a bending space.

The insulating protective layer 6 is provided on the outside of the bending area at the bending of the display substrate 1, i.e., the insulating protective layer 6 is provided on the side of the display structure layer 102 away from the base substrate 101. The first gap 13 is provided between the insulating protective layer 6 and the polarizer 9, and at least a portion of the first gap 13 is provided within the bending area. The touch structure 8 is connected to a signal lead on the display substrate 1 through a through-hole provided in the display substrate 1, and a signal of the touch structure 8 is connected to the main control circuit board 12 through the display substrate 1.

The display substrate 1, the encapsulation layer 5 and the touch structure 8 may be an integral structure.

In an example embodiment, the base substrate 101 may be made of an organic material, such as polyimide, polycarbonate, polyacrylate, polyetherimide, polyethersulfone, polyethylene terephthalate, polyethylene naphthalate, and other resin materials, for example, the base substrate 101 may be formed by a plurality of layers of materials. The base substrate 101 may also be an ultra-thin glass.

In the display area AA, the display structure layer 102 of the display substrate 1 may include a plurality of pixel units (not shown in the drawings) arranged in an array, and each pixel unit may include at least three sub-pixels. Each sub-pixel may include a pixel driving circuit formed of a plurality of thin-film transistors and a storage capacitor, and a light emitting device layer. The thin-film transistor may include a gate electrode, a gate insulating layer, an active layer, a source electrode and a drain electrode.

Figure 3:
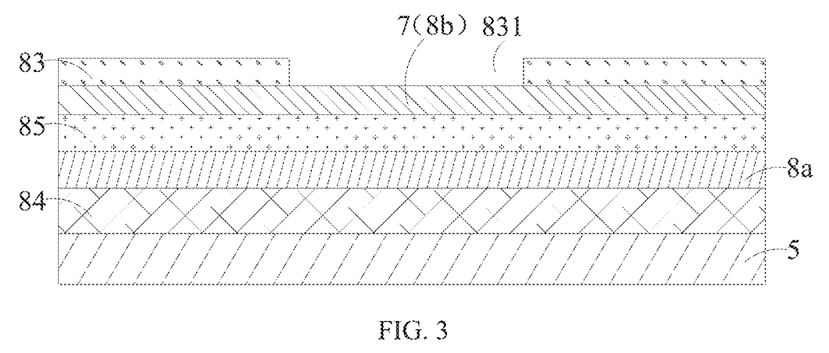
FIG. 3 is a schematic cross-sectional diagram taken along H-H in FIG. 1.
Figure 4:
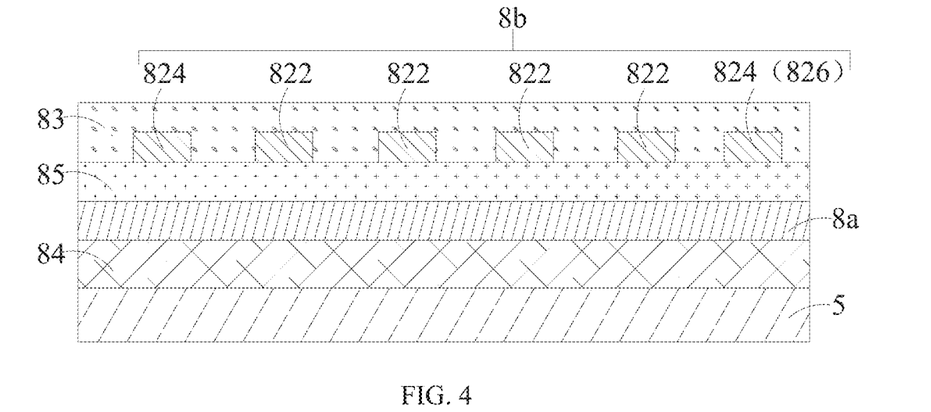
FIG. 4 is a schematic cross-sectional diagram taken along I-I in FIG. 1.

FIGS. 3 and 4 are schematic diagrams of the layer structure of the touch structure 8. As shown in FIGS. 3 and 4, the touch structure 8 may include a second insulating layer 84 provided on a side of the encapsulation layer 5 away from the display substrate 1, a first touch metal layer 8a provided on a side of the second insulating layer 84 away from the encapsulation layer 5, a third insulating layer 85 provided on a side of the first touch metal layer 8a away from the encapsulation layer 5, a first touch metal layer 8a provided on a side of the first touch metal layer 8a away from the encapsulation layer 5, a second touch metal layer 8b provided on a side of the third insulating layer 85 away from the encapsulation layer 5, and a first insulating layer 83 provided on a side of the second touch metal layer 8b away from the encapsulation layer 5.

The first touch metal layer 8a may include a first touch electrode 811, a second touch electrode 821, and a second connection portion. The second touch metal layer 8b may include a first connection portion 88, a touch-sensing lead 822, a touch-sensing ground lead 824 (one of which is a second conductive line 816), a touch-driving lead 812, a touch-driving ground lead 813 (one of which is a third conductive line 826), and the first conductive line 7, i.e., the first conductive line 7, the second conductive line 816, and the third conductive line 826 are provided in the same layer as the second touch metal layer 8b and formed of the same material as the second touch metal layer 8b.

The via hole 831 is provided in the first insulating layer 83, an orthographic projection of the via hole 831 on the base substrate 101 is provided within an orthographic projection of the first conductive line 7 on the base substrate 101, and a cross-sectional area of the via hole 831 parallel to the base substrate 101 is smaller than a cross-sectional area of the first conductive line 7 parallel to the base substrate 101. The via hole 831 has a long distance from the second conductive line 816 and the third conductive line 826, therefore there is no risk of corrosion of the signal lines (the second conductive line 816 and the third conductive line 826) during the reliability test.

Figure 2:
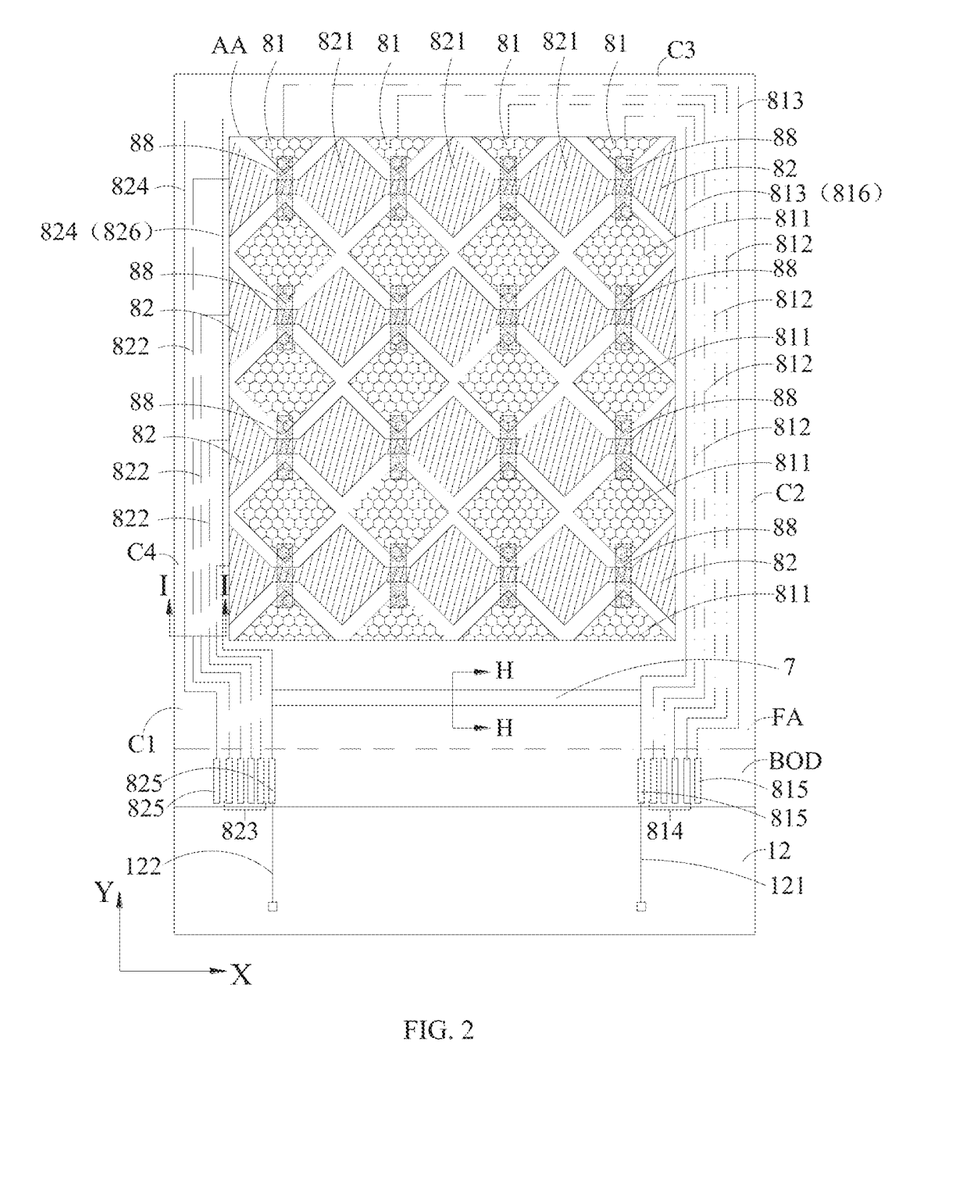
FIG. 2 is a top view of the display device of FIG. 1.

Specifically, the touch structure 8 may be a mutual capacitance structure. Referring to FIG. 2, the touch structure 8 may include a plurality of first touch units 81 and a plurality of second touch units 82. The second touch unit 82 has a line shape extending along a first direction X. and the plurality of second touch units 82 are sequentially arranged along the second direction Y. The first touch unit 81 has a line shape extending along a second direction Y, and the plurality of first touch units 81 are sequentially arranged along the first direction X. The first direction X is intersected with the second direction Y. Each first touch unit 81 may include a plurality of first touch electrodes 811 and first connection portions 88 arranged sequentially along the second direction Y. The plurality of first touch electrodes 811 are spaced apart from each other, and adjacent first touch electrodes 811 are connected to each other by the first connection portion 88. Each second touch unit 82 may include a plurality of second touch electrodes 821 and second connection portions arranged sequentially along the first direction X. The plurality of second touch electrodes 821 are spaced apart from each other, and adjacent second touch electrodes 821 are connected to each other through the second connection portion.

The first touch electrode 811 and the second touch electrode 821 form a capacitance. By detecting a change in the capacitance, a position of the touch point may be determined.

In an example embodiment, the first touch electrode 811, the second touch electrode 821, and the second connection portion are provided in the same layer and may be formed by a single patterning process, and the second touch electrode 821 and the second connection portion are of an integral structure. The first connection portion 88 may be provided in a bridging layer to form a bridging structure, and an insulating layer is provided between the first connection portion 88 and the second connection portion.

In some other example embodiments, the first touch electrode 811, the first connection portion and the second touch electrode 821 are provided in a same layer and may be formed by a single patterning process, the first touch electrode 811 and the first connection portion are of an integral structure, the second connection portion may be provided in a bridging layer to form a bridging structure, and an insulating layer is provided between the first connection portion and the second connection portion.

In an example embodiment, the first touch electrode 811 may be a driving electrode, and the second touch electrode 821 may be a sensing electrode. In some other example embodiments, the first touch electrode 811 may be a sensing electrode and the second touch electrode 821 may be a driving electrode.

The plurality of first touch units 81 and the plurality of second touch units 82 form M rows of driving electrodes*N columns of sensing electrodes. i.e., including M first touch units 81 and N second touch units 82, where M and N are positive integers greater than 2.

In some example embodiments, the first touch electrode 811 and the second touch electrode 821 may have a rhombic shape, for example, may be a square rhombus, or a rhombic with a longer horizontal length, or a rhombic with a longer vertical length. In some possible embodiments, the first touch electrode 811 and the second touch electrode 821 may have any one or more of triangle, square, trapezoid, parallelogram, pentagon, hexagon, and other polygon, which is not limited in the present disclosure.

In some example embodiments, the first touch electrode 811 and the second touch electrode 821 may be in the form of transparent conductive electrodes. In some example embodiments, the first touch electrode 811 and the second touch electrode 821 may be in the form of a metal mesh which is formed of a plurality of metal wires interlaced. The metal mesh includes a plurality of mesh patterns, the mesh pattern is a polygon formed by a plurality of metal wires. The first touch electrode 811 and the second touch electrode 821 in the form of metal mesh have the advantages of low resistance, thin thickness, and fast response speed.

In an example embodiment, as shown in FIG. 2, in the non-display area FA, the touch structure 8 may include a plurality of touch-driving leads 812, a plurality of touch-sensing leads 822, at least two touch-sensing ground leads 824, and at least two touch-driving ground leads 813 (for clarity of representation, different leads in the figure are distinguished by using different line patterns).

A plurality of touch binding pins are provided in the bonding area BOD, and the touch binding pins include a touch-sensing binding pin 823, a touch-driving binding pin 814, a touch-driving ground pin 815, and a touch-sensing ground pin 825.

The first touch electrode 811 is connected to the touch-driving binding pin 814 through the touch-driving lead 812, and the touch-driving ground lead 813 is connected to the touch-driving ground pin 815. The second touch electrode 821 is connected to the touch-sensing binding pin 823 through the touch-sensing lead 822, and the touch-sensing ground lead 824 is connected to the touch-sensing ground pin 825. The touch-driving binding pin 814, the touch-driving ground pin 815, the touch-sensing binding pin 823, and the touch-sensing ground pin 825 are all bonded to the main control circuit board 12 to transmit signals to the main control circuit board 12.

The touch-driving lead 812 and the touch-driving ground lead 813 are connected to the bonding area BOD via the second side area C2 and the first side area C1. The touch-sensing lead 822 and the touch-sensing ground lead 824 are connected to the bonding area BOD via the fourth side area C4 and the first side area C1.

Two touch-sensing ground leads 824 are provided at two opposite sides of the plurality of touch-sensing leads 822, i.e., the plurality of touch-sensing leads 822 form a touch-sensing lead group. At least one touch-sensing ground lead 824 is provided respectively at the two sides of the touch-sensing lead group, one of the two touch-sensing ground leads 824 is provided at a side close to the display area AA, and the other one of the two touch-sensing ground leads 824 is provided at a side away from the display area AA. The one of the two touch-sensing ground leads 824 close to the display area AA is the third conductive line 826. The extension direction and the bending position of the touch-sensing ground lead 824 are adapted to the extension direction and the bending position of the touch-sensing lead 822, so that the touch-sensing ground lead 824 is substantially parallel to the touch-sensing lead 822. The main control circuit board 12 is provided with a fifth conductive line 122 bonded to the third conductive line 826.

Two touch-driving ground leads 813 are provided at two opposite sides of the plurality of touch-driving leads 812, i.e., the plurality of touch-driving leads 812 form a touch-driving lead group. At least one touch-driving ground lead 813 is provided respectively at the two sides of the touch-driving lead group, one of the two touch-driving ground leads 813 is provided at a side close to the display area AA, and the other one of the two touch-driving ground leads 813 is provided at a side away from the display area AA. The one of the two touch-driving ground leads 813 close to the display area AA is the second conductive line 816. The extension direction and the bending position of the touch-driving ground lead 813 are adapted to the extension direction and the bending position of the touch-driving lead 812, so that the touch-driving ground lead 813 is substantially parallel to the touch-driving lead 812. The main control circuit board 12 is provided with a fourth conductive line 121 bonded to the second conductive line 816.

In an example embodiment, the first gap 13 is provided between the insulating protective layer 6 and the polarizer 9. The first conductive line 7 is provided on a side of the third insulating layer 85 away from the encapsulation layer 5, the orthographic projection of the first conductive line 7 on the base substrate 101 is coincided with the orthographic projection of the first gap 13 on the base substrate 101, or the orthographic projection of the first gap 13 on the base substrate 101 is within the orthographic projection of the first conductive line 7 on the base substrate 101, and the extension direction of the first conductive line 7 is the same as the extension direction of the first gap 13, so that the first conductive line 7 is fully filled/arranged in the first gap 13, and thus regardless of where the static electricity enters the display device from the first gap 13, it will be conducted away through the first conductive line 7 without being conducted to the display area AA or the bonding area BOD to affect the display structure or the bonding pins.

It should be noted that in some other example embodiments of the present disclosure, the polarizer 9 is not provided, in which case the first gap 13 may be a gap between the insulating protective layer 6 and the display area AA. The first gap 13 may also be a gap between the insulating protective layer 6 and any insulating layer provided on the display substrate 1.

The via hole 831 is provided in the first insulating layer 83, and the via hole 831 is connected to the first conductive line 7 to expose the first conductive line 7. The via hole 831 is provided so that the surface of the first conductive line 7 is not covered by an insulating layer, therefore the static electricity is more likely to be accumulated at the exposed surface of the first conductive line 7 and thus may be conducted away through a ground lead GND.

An end of the first conductive line 7 is connected to the second conductive line 816, and the opposite other end of the first conductive line 7 is connected to the third conductive line 826.

Figure 6:
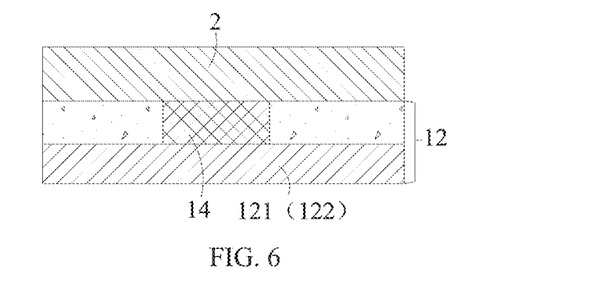
FIG. 6 is a schematic structure diagram showing a fourth conductive line and a fifth conductive line being connected to a heat dissipation film after a display device of the present disclosure being bent.

Referring to FIG. 6, the main control circuit board 12 is provided with a through-hole, which is connected to the fourth conductive line 121 and the fifth conductive line 122 (or the fourth conductive line 121 or the fifth conductive line 122). Alternatively, the ground point of the main control circuit board 12 is exposed at the through-hole, and the second conductive line 816 and the third conductive line 826 (or the second conductive line 816 or the third conductive line 826) remain electrically connected to the ground point. After the display substrate 1 is bent, the second conductive line 816 and the third conductive line 826 (or the second conductive line 816 or the third conductive line 826) are electrically connected to the heat dissipation film 2 via the fourth conductive line 121 and the fifth conductive line 122 (or the fourth conductive line 121 or the fifth conductive line 122) provided on the main control circuit board 12, the conductive adhesive layer 14 between the main control circuit board 12 and the heat dissipation film 2, and the conductive adhesive layer 14 in the through-hole, and the metal layer in the heat dissipation film 2 is equivalent to a ground electrode for grounding the first conductive line 7, so that the static electricity may be effectively conducted away.

In comparison with the solution in which the metal cover adhesive layer is coated to be flush with the edge of polarizer 9 or the ground area of the main control circuit board 12 is increased, the design described above has the following advantages: the present disclosure locates the position of the ESD breakdown of the display device (the first gap 13 between the insulating protective layer 6 and the polarizer 9), and in view of the breakdown position, the present disclosure conducts the static electricity to the first conductive line 7, and then conducts the static electricity to the heat dissipation sheet (a ground electrode) through the second conductive line 816 and the third conductive line 826 (or the second conductive line 816 or the third conductive line 826) instead of blocking the ESD transmission, which is more stable from the process point of view.

It should be noted that the first conductive line 7 may not be grounded through the second conductive line 816 and the third conductive line 826, for example, a first conductive line bonding pin may be provided in the bonding area BOD of the display substrate 1, a first lead is provided in the lead area, the first conductive line 7 is connected to the first conductive line bonding pin through the first lead, the first conductive line bonding pin is bonded to the main control circuit board 12, a ground conductive line is provided on the main control circuit board 12, the ground conductive line is electrically connected to the heat dissipation film 2 through the conductive adhesive layer 14 between the main control circuit board 12 and the heat dissipation film 2, and the heat dissipation film 2 is equivalent to a ground electrode, so that the first conductive line 7 is grounded, and thus the static electricity can be effectively conducted away.

Of course, in the display device without the touch structure 8, the first conductive line 7, the second conductive line 816 and the third conductive line 826 may be provided in the same layer and with the same material as the source/drain electrode. The first insulating layer 83 may be an insulating layer provided on the side of the source/drain electrode away from the base substrate 101. The first insulating layer 83 may be a single layer or a plurality of layers, which are all within the protection scope of the present disclosure.

The so-called "provided in the same layer and with the same material" refers to being formed by the same patterning process.

Further, an embodiment of the present disclosure also provides a display apparatus, which may include the display device described in any one of the above. The specific structure of the display device has been described in detail above, and therefore will not be repeated herein.

The specific type of the display apparatus is not particularly limited, specifically, it may be for example a mobile device such as a mobile phone, a wearable device such as a watch, a VR device, and so on, and a person skilled in the art may make selection accordingly according to the specific use of the display apparatus, which will not be repeated herein.

It should be noted that the display apparatus includes other necessary parts and compositions in addition to the display device, by taking a display as an example, specifically, it may include for example, a housing, a circuit board, a power cord, and so on, and a person skilled in the art may make corresponding additions according to the specific use of the display device, which will not be repeated herein.

The beneficial effects of the display apparatus provided by the example embodiment of the present disclosure in comparison with the related art are the same as the beneficial effects of the display device provided by the above example embodiments, which will not be repeated herein.

A person skilled in the art may obtain other embodiments of the present disclosure upon consideration of the specification and practice of the invention disclosed herein. The present application is intended to cover any variations, uses, or adaptations of the present disclosure that follow the general principles of the present disclosure and include the common knowledge or conventional technical means in the art not disclosed herein. The specification and embodiments are to be regarded as exemplary only, and the true scope and spirit of the present disclosure is indicated by the appended claims.

What is claimed is:

1. A display device having a display area and a non-display area adjacent to the display area, an insulating protective layer being provided in the non-display area, and a first gap being provided between the insulating protective layer and the display area, wherein the display device comprises:
   a display substrate comprising a base substrate and a display structure layer formed on the base substrate;
   a first conductive line provided on the display substrate, an orthographic projection of the first gap on the base substrate being coincided with or being within an orthographic projection of the first conductive line on the base substrate, and an extension direction of the first conductive line being the same as an extension direction of the first gap; and
   a first insulating layer provided on a side of the first conductive line away from the base substrate, the first insulating layer being provided with a via hole, and the via hole being connected to the first conductive line to expose the first conductive line.

2. The display device according to claim 1, further comprising:
   a second conductive line provided in the non-display area and connected to a ground electrode, the second conductive line being connected to an end of the first conductive line, and an extension direction of the second conductive line being intersected with the extension direction of the first conductive line.

3. The display device according to claim 2, further comprising:
   a third conductive line provided in the non-display area and connected to the ground electrode, the third conductive line being connected to another end of the first conductive line, and an extension direction of the third conductive line being intersected with the extension direction of the first conductive line.

4. The display device according to claim 3, further comprising:
   an encapsulation layer provided on a side of the display substrate; and
   a touch structure provided on a side of the encapsulation layer away from the display substrate, and in the display area, the touch structure comprising a plurality of first touch units and a plurality of second touch units.

5. The display device according to claim 4, further comprising:
   a polarizer provided on a side of the touch structure away from the display substrate,
   wherein the insulating protective layer is a metal cover adhesive layer, and the first gap is a gap between the metal cover adhesive layer and the polarizer.

6. The display device according to claim 4, wherein a bonding area is provided in the non-display area, and the display device further comprises:
   a heat dissipation film provided on a side of the display substrate away from the encapsulation layer;
   a main control circuit board bonded to the bonding area, one or both of the second conductive line and the third conductive line being electrically connected to the main control circuit board; and
   a conductive adhesive layer adhered between the heat dissipation film and the main control circuit board,
   wherein one or both of the second conductive line and the third conductive line is electrically connected to the heat dissipation film via the conductive adhesive layer so as to be grounded.

7. The display device according to claim 4, wherein the touch structure comprises:
   a second insulating layer provided on a side of the encapsulation layer away from the base substrate;
   a first touch metal layer provided on a side of the second insulating layer away from the base substrate;
   a third insulating layer provided on a side of the first touch metal layer away from the base substrate; and
   a second touch metal layer provided on a side of the third insulating layer away from the base substrate,
   wherein the first insulating layer is provided on a side of the second touch metal layer away from the base substrate, and
   the first conductive line, the second conductive line and the third conductive line all are provided in a same layer as the second touch metal layer and formed of a same material as the second touch metal layer.

8. The display device according to claim 4, further comprising:
   a touch-sensing lead group provided in the non-display area, the touch-sensing lead group comprising a plurality of touch-sensing leads, and the touch-sensing lead being connected between the first touch unit and the bonding area;
   at least two touch-sensing ground leads provided in the non-display area and correspondingly located at two opposite sides of the touch-sensing lead group;
   a touch-driving lead group provided in the non-display area, the touch-driving lead group comprising a plurality of touch-driving leads, and the touch-driving lead being connected between the second touch unit and the bonding area; and
   at least two touch-driving ground leads provided in the non-display area and correspondingly located at two opposite sides of the touch-driving lead group,
   wherein a portion of the touch-sensing leads and a portion of the touch-driving leads are provided at two opposite sides of the display area.

9. The display device according to claim 8, wherein one of the at least two touch-sensing ground leads close to the display area is the second conductive line; and
   one of the at least two touch-driving ground leads close to the display area is the third conductive line.

10. A display apparatus comprising a display device, wherein the display device has a display area and a non-display area adjacent to the display area, an insulating protective layer is provided in the non-display area, and a first gap is provided between the insulating protective layer and the display area, wherein the display device comprises:
a display substrate comprising a base substrate and a display structure layer formed on the base substrate;
a first conductive line provided on the display substrate, an orthographic projection of the first gap on the base substrate being coincided with or being within an orthographic projection of the first conductive line on the base substrate, and an extension direction of the first conductive line being the same as an extension direction of the first gap; and
a first insulating layer provided on a side of the first conductive line away from the base substrate, the first insulating layer being provided with a via hole, and the via hole being connected to the first conductive line to expose the first conductive line.

11. The display apparatus according to claim 10, wherein the display device further comprises:
a second conductive line provided in the non-display area and connected to a ground electrode, the second conductive line being connected to an end of the first conductive line, and an extension direction of the second conductive line being intersected with the extension direction of the first conductive line.

12. The display apparatus according to claim 11, wherein the display device further comprises:
a third conductive line provided in the non-display area and connected to the ground electrode, the third conductive line being connected to another end of the first conductive line, and an extension direction of the third conductive line being intersected with the extension direction of the first conductive line.

13. The display apparatus according to claim 12, wherein the display device further comprises:
an encapsulation layer provided on a side of the display substrate; and
a touch structure provided on a side of the encapsulation layer away from the display substrate, and in the display area, the touch structure comprising a plurality of first touch units and a plurality of second touch units.

14. The display apparatus according to claim 13, wherein the display device further comprises:
a polarizer provided on a side of the touch structure away from the display substrate,
wherein the insulating protective layer is a metal cover adhesive layer, and the first gap is a gap between the metal cover adhesive layer and the polarizer.

15. The display apparatus according to claim 13, wherein a bonding area is provided in the non-display area, and the display device further comprises:
a heat dissipation film provided on a side of the display substrate away from the encapsulation layer;
a main control circuit board bonded to the bonding area, one or both of the second conductive line and the third conductive line being electrically connected to the main control circuit board; and
a conductive adhesive layer adhered between the heat dissipation film and the main control circuit board,
wherein one or both of the second conductive line and the third conductive line is electrically connected to the heat dissipation film via the conductive adhesive layer so as to be grounded.

16. The display apparatus according to claim 13, wherein the touch structure comprises:
a second insulating layer provided on a side of the encapsulation layer away from the base substrate;
a first touch metal layer provided on a side of the second insulating layer away from the base substrate;
a third insulating layer provided on a side of the first touch metal layer away from the base substrate; and
a second touch metal layer provided on a side of the third insulating layer away from the base substrate,
wherein the first insulating layer is provided on a side of the second touch metal layer away from the base substrate, and
the first conductive line, the second conductive line and the third conductive line all are provided in a same layer as the second touch metal layer and formed of a same material as the second touch metal layer.

17. The display apparatus according to claim 13, wherein the display device further comprises:
a touch-sensing lead group provided in the non-display area, the touch-sensing lead group comprising a plurality of touch-sensing leads, and the touch-sensing lead being connected between the first touch unit and the bonding area;
at least two touch-sensing ground leads provided in the non-display area and correspondingly located at two opposite sides of the touch-sensing lead group;
a touch-driving lead group provided in the non-display area, the touch-driving lead group comprising a plurality of touch-driving leads, and the touch-driving lead being connected between the second touch unit and the bonding area; and
at least two touch-driving ground leads provided in the non-display area and correspondingly located at two opposite sides of the touch-driving lead group,
wherein a portion of the touch-sensing leads and a portion of the touch-driving leads are provided at two opposite sides of the display area.

18. The display apparatus according to claim 17, wherein one of the at least two touch-sensing ground leads close to the display area is the second conductive line; and
one of the at least two touch-driving ground leads close to the display area is the third conductive line.

* * * * *